May 30, 1950

R. L. SPROULL

FREQUENCY MODULATION SYSTEM FOR MICROWAVE GENERATORS 2,510,026

Filed April 5, 1946

4 Sheets-Sheet 1

INVENTOR.
Robert L. Sproull
BY
C. D. Tuska
ATTORNEY

INVENTOR.
Robert L. Sproull
BY C. D. Tuska
ATTORNEY

INVENTOR.
Robert L. Sproull
BY
C. D. Tuska
ATTORNEY

INVENTOR.
Robert L. Sproull
BY C. D. Tuska
ATTORNEY

UNITED STATES PATENT OFFICE 2,510,026

FREQUENCY MODULATION SYSTEM FOR MICROWAVE GENERATORS

Robert L. Sproull, Ithaca, N. Y., assignor to Radio Corporation of America, a corporation of Delaware Application April 5, 1946, Serial No. 659,705

27 Claims. (Cl. 332—29)

Figures 1, 5:
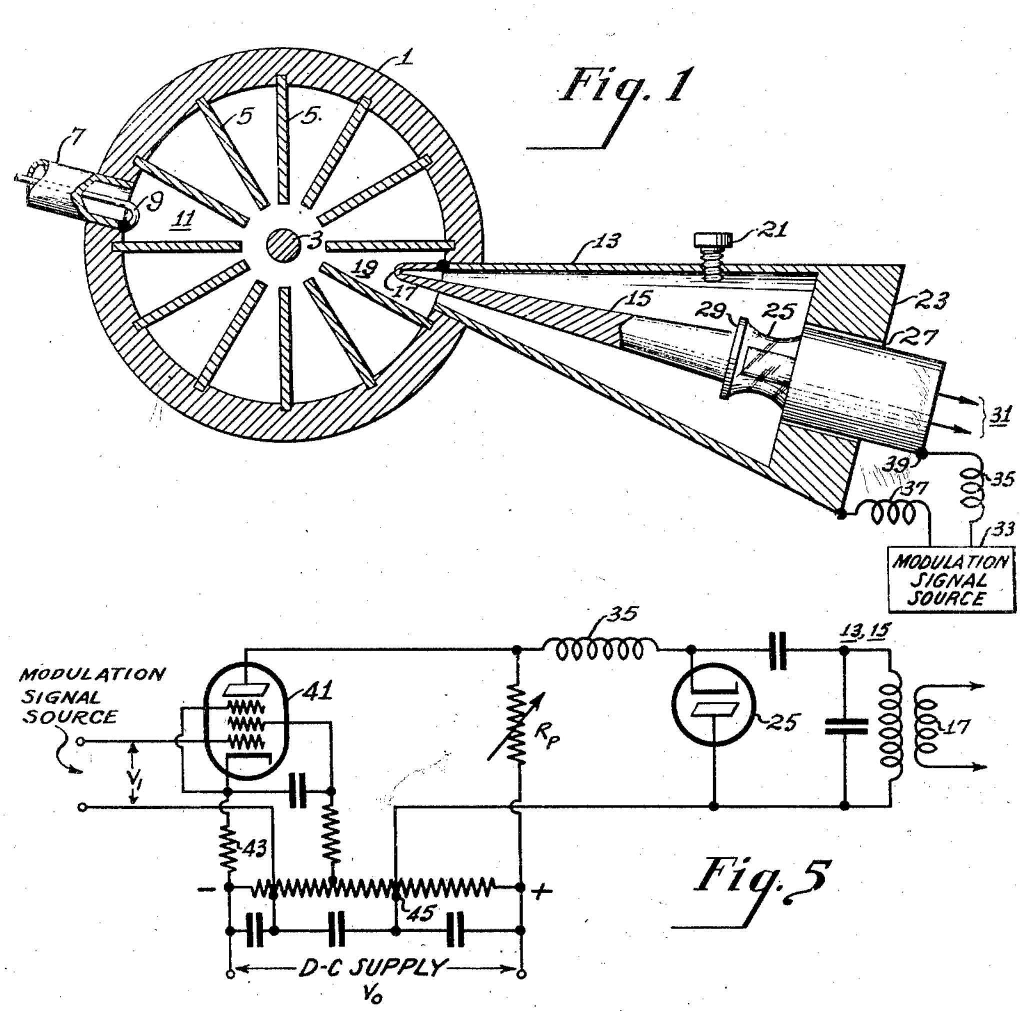

This invention relates generally to radio frequency wave generation and more particularly to improved methods of and means for modulating the frequency of wave generators.

For rapid transmission of intelligence by a frequency modulated radio frequency signal, a means is required for varying rapidly the frequency of the energy generated by the radio frequency oscillator. It is essential that the generated energy remain substantially constant in magnitude as the frequency is varied, in order that negligible amplitude modulation will be associated with the desired frequency modulation. These objectives are realized in the instant invention by an improved method of and means for utilizing a variably-tuned resonant circuit which is closely coupled to the oscillator "tank circuit," and by employing an electronic device such as a thermionic diode or triode to vary the "Q" (ratio of reactance to resistance) of the variably tuned resonant circuit. Due to the inherent characteristics of coupled reactive circuits, the variations in Q produced in the resonant circuit vary the frequency of the oscillations generated by the radio frequency oscillator. Since the loading (abstraction of oscillatory energy) provided by the diode can be controlled by varying the average potential difference between the electrodes of the diode, the frequency of the generated signals may be varied at a rapid rate by means of a varying diode control voltage.

The invention will be described herein by reference to its application to the frequency modulation of microwave signals generated by a conventional magnetron oscillator. A preferred embodiment of the invention comprises a magnetron oscillator of the multi-cavity type wherein the load is coupled to one of the magnetron resonant cavities by means of a coupling loop projecting into the cavity. The variably tuned resonant circuit comprises a coaxial line resonator having one end thereof terminated in a second coupling loop which extends into another one of the resonant cavities of the magnetron. A thermionic diode is serially connected with the inner conductor of the coaxial line at a point adjacent to the end thereof remote from the magnetron. Initial tuning of the coaxial line to a frequency of the order of the resonant frequency of the magnetron is accomplished by means of a tuning screw or plunger extending into the coaxial line. A source of modulation signals applied to the diode provides corresponding variations of the conductance of the diode, thereby providing variations in "Q" (ratio of reactance to resistance) of the coaxial line. Such variations in the "Q" of the coaxial line in response to the modulation signals provide corresponding variations of the microwave frequency generated by the magnetron and the associated coaxial line.

The improved system thus provided permits frequency modulation of the microwave signals over a band of the order of 50 times the width of that obtainable by directly varying the "Q" of the tank circuit of the magnetron oscillator to a similar extent to the variation in "Q" of the coaxial line coupled thereto. Furthermore, by operating the associated microwave magnetron and variably tuned coaxial resonant circuit in the second quadrant of their reactive characteristic, transit time effects in the thermionic diode may be utilized to supplement the variations in conductance of the diode in response to the modulating signals.

Since the diode normally provides an increasing rate of change of microwave frequency modulation as a function of increasing magnitudes of the modulating voltage, a correction circuit is provided which is responsive to the diode current and which effectively compensates for such non-linearity of frequency modulation to provide an improved system wherein the frequency modulation is a substantially linear function of the modulating signals.

An improved diode is disclosed which minimizes undesirable transit time effects and which provides, by means of a secondary-electron-emissive anode, extremely stable operation at high peak energy microwave levels.

Among the objects of the invention are to provide an improved method of and means for frequency modulating a radio frequency generator. Another object is to provide an improved method of and means for frequency modulating a wave generator while minimizing undesirable amplitude modulation of the microwave signals. A further object is to provide an improved radio frequency modulation system utilizing a tuned circuit coupled to the microwave generator "tank circuit" wherein a variable conductance device responsive to a source of modulation signals varies the "Q" (ratio of reactance to resistance) of the tuned circuit which thereby provides frequency modulation of the microwave oscillations. Another object is to provide an improved method of and means for employing a tuned circuit including an electronic device for modulating the frequency of a microwave generator comprising tuning said circuit to a frequency of the order of that of said generator and varying at a modulation frequency the conductance and reactance of said device. A still further object of the invention is to provide an improved diode thermionic tube having a secondary-electron-emissive anode electrode in which the anode and cathode electrodes are critically spaced to provide desired transit time characteristics. Another object is to provide an improved compensating circuit for a microwave frequency modulation system whereby the modulation of the frequency of the microwave generator is a linear function of the magnitude of signals derived from a modulation signal source.

A still further object of the invention is to provide an improved method of and means for employing a tuned circuit including an electronic device for modulating the frequency of a microwave generator including a second resonant tank circuit wherein said resonant circuits are coupled together and operated in the second quadrant of their resonant charactericties. Another object of the invention is to provide an improved microwave frequency modulation system employing a microwave generator having a frequency determining cavity resonator, a tuned coaxial line coupled to said resonator, and a variable conductance device connected to said line and responsive to a source of modulation signals. A still further object is to provide an improved microwave frequency modulation system including a microwave generator having a carrier frequency determining cavity resonator, and a second resonator coupled to said generator resonator and including a variable conductance device responsive to a source of modulation signals for varying the "Q" of the second resonator and providing corresponding variations of the microwave frequency of the microwave generator.

Figure 6:
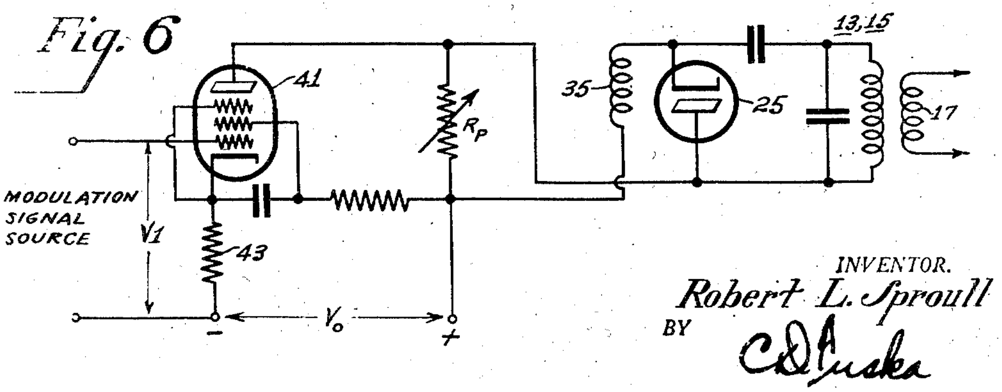
Figure 7:
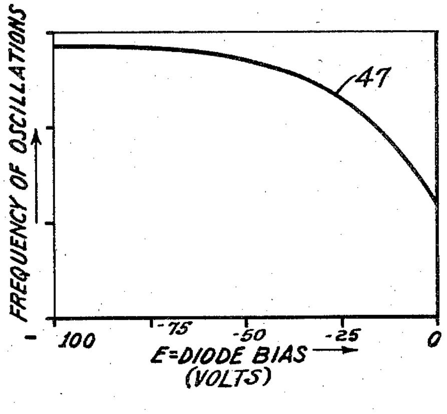
Figure 8:
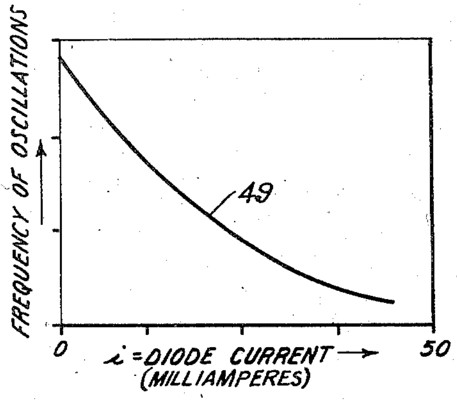
Figure 2:
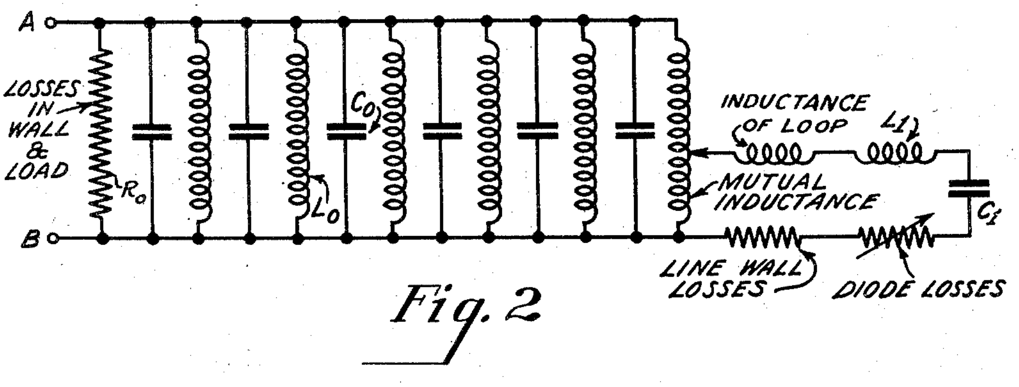
Figure 3:
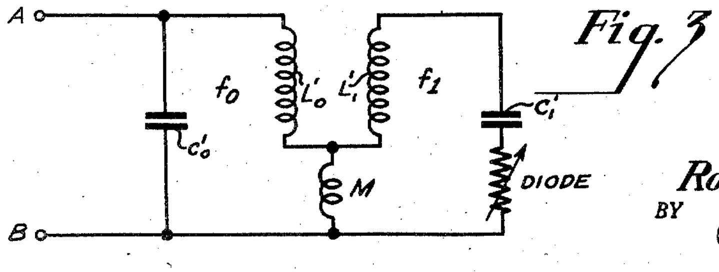
Figure 4:
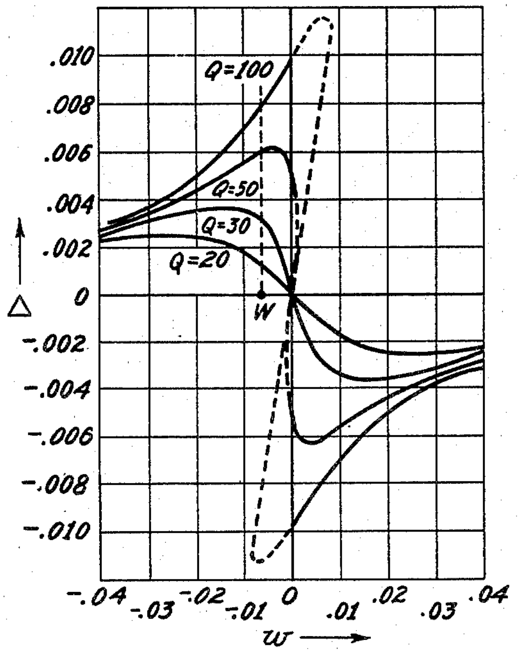
Figure 9:
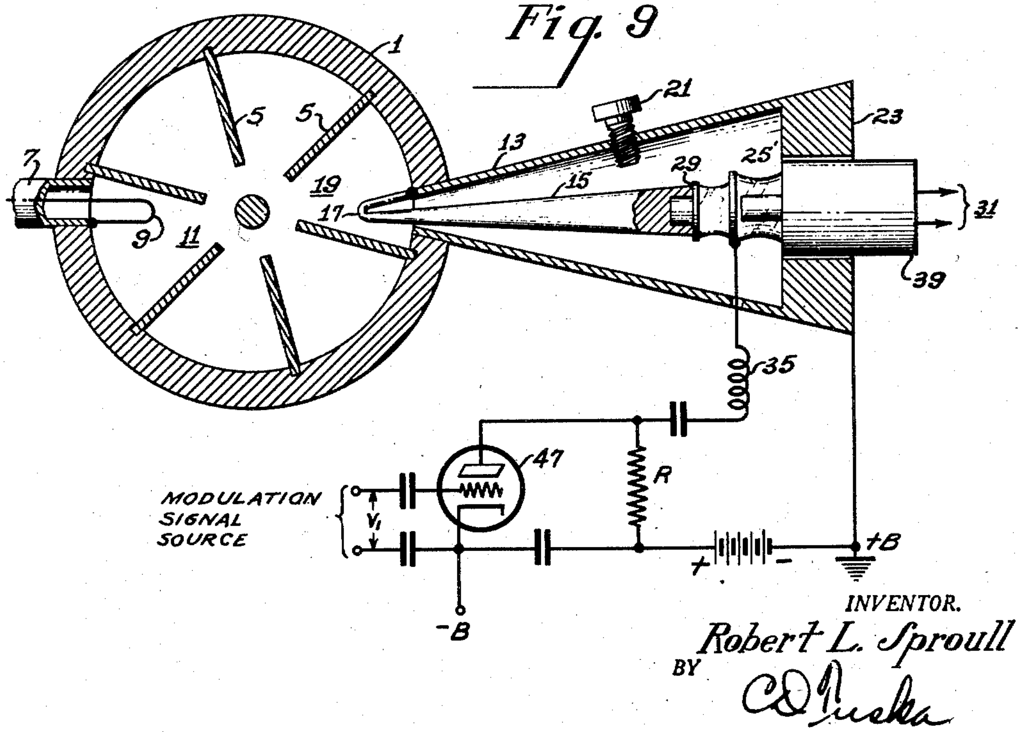
Figure 10:
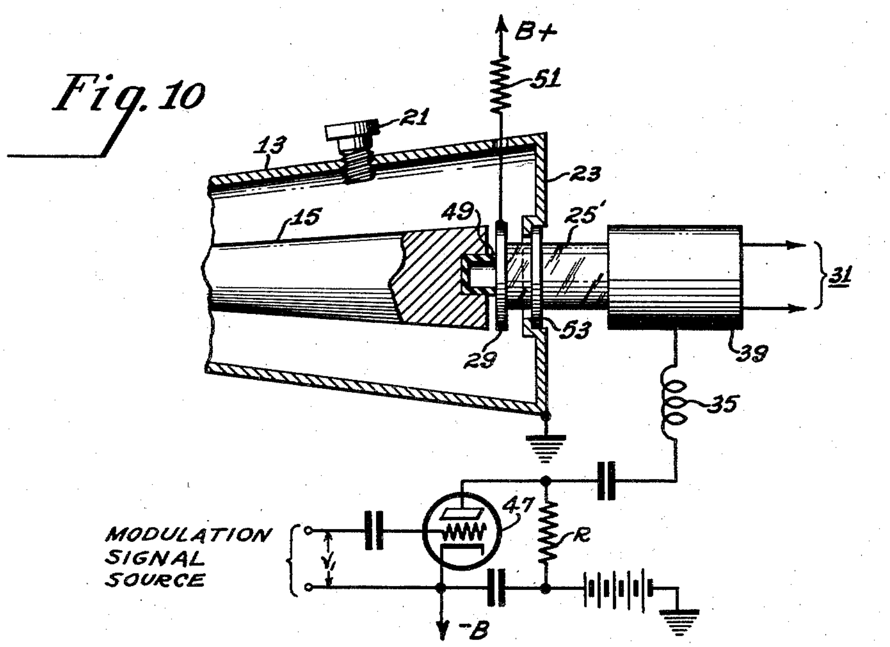
Figure 11:
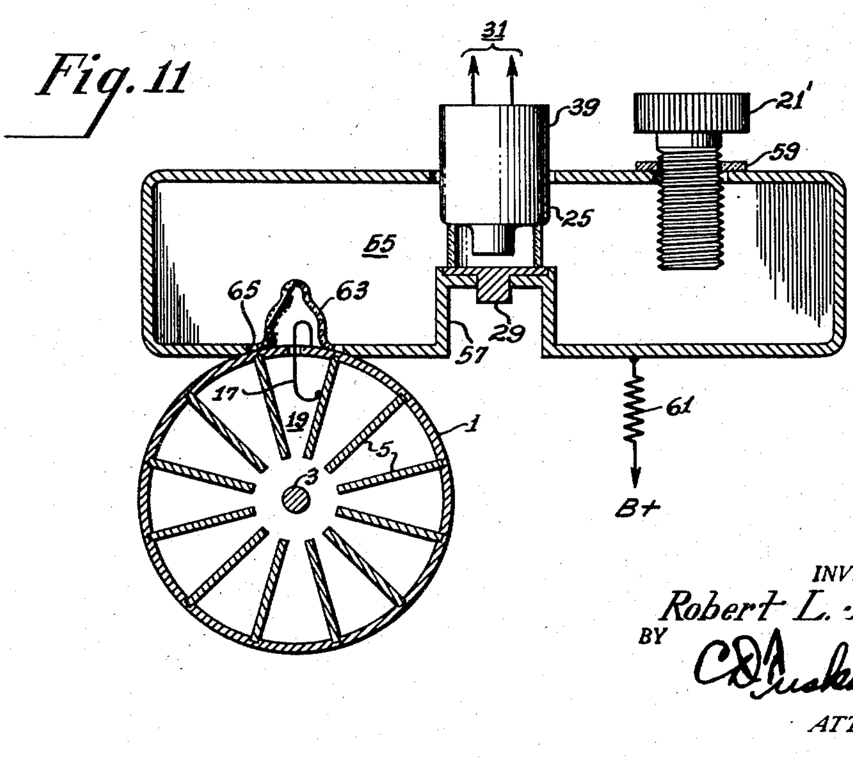

The invention will be described in greater detail by reference to the accompanying drawings of which Figure 1 is a cross-sectional, partially schematic, plan view of a first embodiment thereof; Figure 2 is a schematic circuit diagram of the equivalent lumped circuit of the device of Fig. 1; Figure 3 is a schematic circuit diagram of another equivalent lumped circuit corresponding to the structure of Fig. 1; Figure 4 is a family of graphs illustrative of the operation of the invention; Figures 5 and 6 are schematic circuit diagrams of compensating circuits which may be employed with any of the embodiments of the invention to provide a linear relation between frequency modulation and modulation signal magnitude; Figure 7 is a graph indicating the variation in microwave frequency as a function of the modulation voltage applied to the diode thermionic tube of the various embodiments of the invention; Figure 8 is a graph indicating the variation of microwave frequency as a function of the modulation current through said diode; Figure 9 is a cross-sectional, partially schematic view of a second embodiment of the invention employing a triode thermionic tube; Figure 10 is a modification of said second embodiment of the invention; and Figure 11 is a cross-sectional, partially schematic view of a third embodiment of the invention. Similar reference characters are applied to similar elements throughout the drawings.

*Modulator network—I*

Referring to Figure 1, a preferred embodiment of the improved modulation system includes a multi-cavity magnetron oscillator 1 including a centrally located cathode 3 and a plurality of radially extending anode vanes 5 forming a plurality of segmental resonant cavities. A load, not shown, is coupled through a coaxial line 7 which is terminated in a load coupling loop 9 extending into one of the anode cavities 11.

The modulation system includes a tapered coaxial line having an outer conductor 13 and a coaxially disposed inner conductor 15 which is terminated in a second coupling loop 17 extending into a second one of the anode cavities 19. The coaxial line 13—15 may be tuned in any manner known in the art, such for example, as by means of a tuning screw 21 extending into the space between the coaxial conductors 13, 15. The end of the coaxial line 13—15 remote from the magnetron 1 is terminated by an apertured annular member 23. A diode thermionic tube 25 extends through the aperture 27 in the annular member 23 and is insulated from said member to provide the required direct current isolation, and relatively large high-frequency by-pass capacitance. The anode terminal 29 of the diode 25 is inserted in a suitable aperture in the end of the inner coaxial line conductor 15 whereby the diode 25 is effectively serially connected in circuit with the coaxial line 14—15. The cathode may be directly or indirectly heated by means of suitable potentials applied to the cathode heater terminals 31. A source of modulation signals 33 is connected, through suitable microwave chokes 35 and 37, to the cathode terminal 39 of the diode 25 and to the outer conductor 13 of the coaxial line, which is conductively coupled to the diode anode.

Instead of the coupling loops 9 and 17, the load and modulation circuits, respectively, may be coupled into the magnetron cavities 11, 19 through slots or holes suitably proportioned to supply the desired coupling coefficient in accordance with known microwave technique. Other types of tuned microwave circuits may be substituted for the coaxial line 13—15 as will be described in greater detail hereinafter. Also, if desired, the load may be coupled directly to the modulation cavity resonator or line, or into the same magnetron resonator to which the modulation circuit is coupled.

In order to understand the manner in which frequency modulation of the microwave energy generated by the magnetron is accomplished, it is necessary to relate mathematically the "Q" (ratio of reactance to resistance) of the modulation coaxial line 13—15, the resonant frequency $f_1$ of the line, the resonant frequency $f_0$ of the magnetron "tank circuit" or cavity resonator, and the actual frequency $f$ of the resultant oscillations. This relation may be approximately derived by an analysis of a lumped circuit network approximately equivalent to the circuit of Fig. 1. Two such lumped circuits are shown in Figs. 2 and 3 wherein $L_0$ and $C_0$ are the reactive components of the magnetron resonator sections, the resistor $R_0$ represents the loss in the magnetron walls and in the load, the inductor $L_1$ and capacitor $C_1$ represent the reactive components of the tuned coaxial line, and the other circuit componants are indicated by suitable captions. The terminals A, B are effectively coupled to the electron beam of the magnetron. The criterion for the determination of the frequency at which the circuit of Figs. 2 and 3 will provide microwave oscillations is that the total admittance "looking in" at the terminals A, B be purely real. This is essential since it is across these terminals that the electron beam effects sustained oscillations. In other words, it is essential that the reactance of the circuit at the terminals A, B must vanish.

Utilizing this criterion and considering the circuit of Fig. 2 or 3, the following relation obtains which is approximately valid whenever $$|f-f_0| \ll f_0$$

and $$|f-f_1| \ll f_0$$

$$\left(\frac{f-f_0}{f_0}\right)\left\{4Q^2\left(\frac{f-f_1}{f_0}-3k^2\right)+1\right\}= k^2Q^2\left(\frac{f-f_1}{f_0}-3k^2\right) \quad (1)$$

where $$k^2=\frac{M^2}{6L_1L_0}$$

is the coupling coefficient of the two coupled circuits.

Equation 1 may be indicated graphically by adopting a particular value of $k^2=5\times10^{-4}$ and applying the equation for various Q values. As indicated in the graphs of Fig. 4, the abscissa $w$ is chosen to be $$w=\frac{f_1-f_0}{f_0}+3k^2=\frac{f_1-f_0}{f_0}+1.5\times10^{-3} \quad (2)$$

which may be varied independently by mechanically or electrically tuning the coaxial line. In the graphs the ordinates $\Delta$ are $$\Delta=\frac{f-f_0}{f_0} \quad (3)$$

which is proportional to the change in frequency $f$ of the oscillations from a value $f_0$ which is the frequency which would have been produced in the absence of the modulation circuit and coaxial line.

The dashed lines of the graphs in Figure 4 represent points satisfying Equation 1 which do not represent situations which are physically realizable. However, a small part of these dashed curves near $w=0$ may occasionally be observed. For some values of Q and $w$, three different frequencies of oscillation (corresponding to three different values of $\Delta$) all will yield solutions of Equation 1. At which of these frequencies the actual system of Fig. 1 will oscillate depends upon the magnitude of the effective resistance across the terminals A, B of Figs. 2 and 3. It may be shown that for fixed values of Q and $w$ this resistance is always higher in the portions of the graphs of Fig. 4 lying in the second and fourth quadrants. The higher the input resistance across the terminals A, B, the higher will be the oscillating voltage across said terminals in response to excitation by the electron beam. Hence the beam tends to "lock-in" at the frequency which corresponds to the highest shunt resistance across said terminals. Thus, only the solid line portions of the graph of Fig. 4 indicate the actual physical relation between $f$, $f_0$, $f_1$ and Q.

If the coaxial line 13—15 is mechanically tuned by the tuning screw 21 to correspond to the value of $w=W$, the variations of the Q of the circuit will produce the various values of frequency of oscillation corresponding to values of $\Delta$ at the intersections of the various graphs with the vertical line through W. As a typical instance, consider that $f_0=4000$ mc./sec. and $W=-6\times10^{-3}$ (corresponding to $f_1=3970$ mc./sec.). Then for $Q=100, \Delta=8\times10^{-3}, f=4032$ mc./sec.
$=50, \Delta=6\times10^{-3}, f=4024$ mc./sec.
$=30, \Delta=3.2\times10^{-3}, f=4013$ mc./sec.
$=20, \Delta=1.4\times10^{-3}, f=4006$ mc./sec.

Thus, 24 mc./sec. frequency change results when the Q value has been changed from 100 to 20.

The frequency shift provided by varying the Q of the coaxial line coupled to the magnetron cavity resonator is of the order of 50 times greater than that which would be obtainable if the Q of the magnetron cavity resonator itself were varied in a similar manner. This condition follows from the well known expression for the angular natural frequency of a circuit containing L, C and R $$\omega=1/2\pi\sqrt{\frac{1}{LC}-\frac{R^2}{4L^2}} \quad (4)$$

For Q >> 1, approximately $$\omega=\omega_\infty\left(1-\frac{1}{8Q^2}\right) \quad (5)$$

since $$Q=\frac{\omega L}{R}$$

where $\omega_\infty=\omega$ when $Q=\infty$. From Equations 4 and 5, it is seen that for a particular frequency $f_1$ near 4000 mc./sec. and a Q value which varies from 100 to 50, the frequency shift will be about .15 mc./sec. This change is seen to be quite negligible compared to the 8 mc./sec. change provided by the improved system when $W=-6\times10^{-3}$.

The power absorption in the modulation system is a very small fraction of the total power generated by the magnetron oscillator. Furthermore, as the Q of the coupled circuit is lowered by diode conduction from a relatively high value when the diode is non-conducting, the power absorption at first increases. Simultaneously the efficiency of the magnetron oscillator increases because of lower reactive currents in the coupling loop. This effect helps to preserve substantially constant output power as the Q of the coupled circuit is varied by changes in the modulation signals applied to the diode terminals. In a particular example, an output power constant within less than 2 percent was obtained as the frequency was varied through 10 mc. at a mean carrier frequency of 4000 mc. Thus the improved modulation system enables substantial frequency modulation of an ultra-high-frequency oscillator with extremely low attendant amplitude modulation. The system is particularly advantageous when employed with multicavity magnetron oscillators since great stability of control is obtainable.

*Modulator Diode*

At very high frequencies, the fact that electrons do not traverse the space between the diode cathode and anode electrodes instantaneously produces a reactive effect in the circuit. For tubes having moderately long transit angles (45° to 180°, for example) this effect is generally a negative susceptance. If the diode is placed at a point of intense electric field in the tuned circuit or line, this susceptance will decrease the resonant frequency of the circuit. The effect of such a decrease upon the actual frequency of oscillations of the combined magnetron and modulation tuned circuit is generally much smaller than the effect due to the variation in Q produced by the diode in response to the modulation signals. However, it is desirable to proportion the circuit in a manner whereby the susceptance effect adds to, rather than subtracts from, the Q effect.

Referring to the graphs of Fig. 4, it is seen that a decrease in the frequency $f_1$ (caused by an increase in diode current and hence increased magnitude of susceptance) will add to the effect produced by a decrease in Q, (caused by an increased diode current), as long as the circuit is operated in the second quadrant ($f_1$ is less than $f_0$). Hence second quadrant circuit operation is to be preferred.

If desired, a diode containing an inert gas at low pressure may be employed in order further to lower the Q of the circuit. Also, instead of a conventional diode, for example of the "lighthouse" type, a special diode may be employed having a cathode capable of relatively strong electron emission and having a secondary-electron-emissive anode spaced as closely as possible thereto. The surface of the anode may be covered with a secondary-electron-emissive coating having a secondary emission ratio appreciably greater than zero. A satisfactory coating of this type may comprise silver-oxygen-magnesium which provides an extremely large number of secondary electrons per primary electron. Such a special diode permits greater "loading" (lowering of the Q value) of the tuned coaxial line 13—15 for a predetermined diode cathode area. An additional advantage is that the net low frequency current through the diode is minimized for a predetermined reduction in Q. Such operation permits controlling the average bias of the diode, and hence the frequency of oscillations, by an electronic modulation signal source having high internal impedance.

To secure these advantages the average transit times of electrons traveling from cathode to anode in the diode must be appreciable, for example, greater than .1 cycle of the high frequency oscillations. Preferably the anode-cathode spacing, the high frequency field strength and the diode bias voltage should be so related that the largest possible number of electrons arrive at the anode when the net electric field is so directed that any secondary electrons emitted by the anode are projected toward the cathode. Even if these secondary electrons do not reach the cathode, but are returned at a later time to the anode, they remove energy from the high frequency field. At the present time, high-signal-magnitude, long transit-time, space-charge theory for diodes have not been completely resolved, (see B. Salzberg's thesis, May 1941, Polytechnique Institute of Brooklyn) wherein only an approximate (no space charge) theory for a special case has been developed. From this discussion it is seen that, if the diode bias is zero (for maximum conduction and minimum Q), and if the high frequency field strength is $$E=E_0 \cos \omega t \qquad (6)$$

then the spacing $l$ should be such that H takes on values between about .3 and 2, where $$H=\frac{m}{e}\frac{l\omega^2}{E_0} \qquad (7)$$

The significance of the H factor is apparent since $$\frac{2H}{\omega^2}=\gamma^2 \qquad (8)$$

where $\gamma$ is the transit time of an electron in a static field of intensity $E_0$.

At very high frequencies the closest practicable electrode spacings are about .005 inch which produce values of H in this range. For example, if $E_0 l$=50 volts, $l$=.005″, and $\omega=2.5\times10^{10}$ (a frequency of 4000 mc.), then $H$=1.1 which should be approximately the optimum value thereof.

The advantage of increased "driver" circuit output impedance accrues from the fact that any electrons which are emitted from the anode and which strike the cathode will effectively reduce the net electron current emitted by the cathode. Thus the load resistance across the driver circuit may be increased as compared with that permissible when employing a conventional modulator diode.

*Modulation Compensator Circuits*—(*General*)

In the circuits described heretofore it has been found that a modulation signal voltage applied to the modulator diode does not provide a carrier frequency shift which is a linear function of the modulation voltage. However, such linear modulation characteristics are generally highly desirable. Therefore, it is frequently advantageous to include a compensating network in the modulation signal driving circuit to correct for such nonlinearity of frequency modulation. In most instances such a compensating circuit need not provide perfect compensation but will provide satisfactory operation if the frequency modulation is a linear function of the modulating signal voltage to within 2 percent over a band width of 5 mc. at a carrier frequency of 4000 mc.

Such a compensating circuit may include, for example, a pentode thermionic tube operated so that the plate current of the modulation signal pentode "driver tube" will be a linear function of the modulating signal voltage. Therefore, if the anode resistance of the pentode is very low, (the current in its anode resistor considerably larger than that in the modulator diode) then, as indicated in Figs. 7 and 8, $$\frac{dE}{dV}$$

would be constant, but $$\frac{df}{dV}$$

would not be constant, where E is the average diode bias voltage during one high frequency period, V is the modulating voltage, and $f$ is the frequency of oscillation of the high frequency generator. Also if the anode resistance were very large, $$\frac{di}{dV}$$

would be constant, but $$\frac{df}{dV}$$

again would not be constant, where $i$ is the similarly averaged diode current. However, the deviations from a straight line characteristic $$\left(\frac{df}{dV}\right)$$

in the two instances are of opposite sense. By selecting the proper value of driver circuit anode resistance, a combination of voltage and current control may be obtained such that $$\frac{df}{dV}$$

is very nearly constant over considerable frequency and driving voltage ranges. With different adjustments of the coupled circuits and variation of the pentode load resistor value, the signs or values of the slopes of the graphs of Figures 7 and 8 may change but they will always have curvatures which are opposite in sign.

*Modulator Compensator Circuit (Type A)*

A first type of compensating driver circuit which may be employed with any of the embodiments of the invention described herein includes a pentode thermionic tube 41 having fixed screen potential and having the modulation signal source connected to apply a voltage $V_1$ to the control electrode thereof. Degenerative feedback is provided by a series cathode resistor 43. The anode voltage supply $V_0$ is connected through an adjustable anode resistor $R_p$ to the anode electrode of the pentode. The pentode anode electrode also is connected through a microwave choke 35 to the cathode of the diode 25 which is illustrated schematically. The anode of the diode is connected to a point 45 of reference potential of the pentode driving voltage source $V_0$.

As explained heretofore, the diode normally controls the frequency of the microwave generator, in accordance with the graph 47 of Fig. 7, as a function of the signal voltage applied to the diode. Furthermore, the diode controls the frequency of the generator oscillations, in accordance with graph 49 of Fig. 8, as a function of the diode current in response to applied modulation signals. Therefore, it is advantageous to operate the pentode 41 as a constant current device whereby its anode current depends only upon the modulation signal voltage $V_1$ applied to its control electrode whereby the current and voltage characteristics of the modulation circuit may be combined to provide substantially linear control of the microwave generator frequency in response to the modulation signal voltages $V_1$.

When the current in the pentode anode resistor $R_P$ is much greater than the current through the diode 25, the diode has a bias voltage $V_0+aV_1$, where $a$ is a constant, since the pentode is operated as a constant current device in which the anode current depends only upon the input voltage $V_1$ and is practically independent of the resistance of the anode resistor $R_p$, or of the diode 25 within predetermined limits.

However, as the anode resistance $R_p$ is progressively raised until the current in the resistor is negligible with respect to that in the diode, constant current control of the diode is obtained. Thus, for intermediate values of the anode resistor $R_p$, a combination control is provided, and the relative degree of "voltage" and "current" control may be varied by adjustment of the resistor.

Thus, for a tube having linear frequency vs. input voltage response, a very low value of anode resistance would be used, while higher values of anode resistance would be required as the frequency vs. input voltage characteristic became more highly curved. The limiting condition would obtain with complete "current" control for types of tubes wherein the frequency vs. current characteristic was linear. However, some intermediate value of anode resistance may be readily selected for the desired type of driving tube and modulating diode.

The circuit of Figure 6 is similar to that of the circuit of Fig. 5 with the exception that the polarity of the diode 25 is reversed. With this arrangement the current in the anode resistor $R_p$ is equal to the sum of the currents in the diode 25 and in the driving pentode 41. This circuit arrangement operates satisfactorily over a limited range of voltage vs. current control, the limit being reached when the pentode current approaches a zero value. Pure current control may not be attained, but since a control action approximating voltage control is desired, the circuit is adequate under most operating conditions. Under some conditions a triode may be substituted for the pentode driver tube.

*Modulator Network—II*

The circuit of Figure 9 is a similar in all respects to that described heretofore by reference to the circuit of Fig. 1 with the exception that a triode thermionic tube 25', preferably of the "lighthouse" type, is substituted for the diode described heretofore. The modulating voltage derived from the driver tube 47 is applied to the cathode and control grid electrodes of the modulator triode 25'. The anode-cathode circuit of the modulator triode is employed as the variable conductive device in the tuned transmission line 13—15. As in the circuit of Fig. 1, the annular end portion 23 of the coaxial line is capacitively coupled to the modulator cathode electrode. The use of a triode instead of the diode previously described permits increased gain and greater adjustment flexibility in the modulator circuit The circuit of Figure 10 is similar in all respects to the circuit of Fig. 9 with the exception that a grounded-grid triode of the "lighthouse" type is employed, and only the anode-grid circuit of the triode is included in series with the tuned transmission line 13—15, whereby the modulation signal source is effectively isolated from the microwave circuits. In order to provide the required D.-C. isolation for the triode anode 29, it is insulated by means of a thin insulating layer of mica or other material 49 from the inner conductor 15 of the transmission line. Anode potential from a source, not shown, is connected to the anode electrode 29 through an anode resistor 51. The grid electrode 53 is directly grounded to the annular end 23 of the coaxial line 13—15.

*Modulator Network—III*

As explained heretofore the tuned line coupled to the anode cavity 19 of the magnetron 1 may comprise a cavity resonator 55 having a reentrant portion 57 for the diode 25. The diode anode 29 is directly connected to the reentrant portion 57 of the cavity resonator 55, and the cathode 39 thereof is insulated therefrom. The cavity resonator may be tuned to a frequency approximating that of the desired microwave carrier frequency by a tuning screw 21' which, if desired, may be insulated from the cavity walls by an insulating bushing 59. The positive terminal of the anode voltage supply, not shown, for the diode 25 is connected through an anode resistor 65 to the cavity resonator 55.

The cavity resonator 55 is coupled into the anode resonator 19 of the magnetron 1 by means of the coupling loop 17' which extends into an evacuated projecting portion 63 of the magnetron. The projecting portion 63 extends into the interior of the resonator 55 through an aperture 65 in the lower wall thereof. The operation of the cavity resonator embodiment of the invention is similar in most respects to that of the coaxial line embodiments described heretofore, since the diode is coupled to the cavity resonator at a point of maximum field distribution whereby variations in diode conductance and susceptance in response to the modulating potentials applied to the diode effect changes in the Q of the cavity resonator and hence in the generated microwave frequency.

As described heretofore either a diode or a triode may be employed for varying the Q of the cavity resonator in the same manner as employed for controlling the coaxial line embodiments of the invention. The relative positions of the diode, the magnetron coupling element 17' and of the tuning screw 21 may be determined, by mathematical circuit analysis in accordance with known microwave technique, to provide the desired degree of modulation control in response to modulating potentials applied to the diode. If desired, for experimental purposes or for more flexible control, these circuit parameters may be made adjustable.

The invention has been described herein by particular reference to its application to microwave frequency modulation systems and techniques. However, the improved modulation system disclosed also has important applications for low power, relatively low radio frequency systems wherein frequency modulation of the carrier frequency is desired. For example, a simple frequency modulation circuit employing the invention might well include a conventional "Hartley" or "tuned grid-tuned plate" oscillator circuit having a reactive circuit coupled to the oscillator tank circuit wherein said reactive circuit or winding includes the diode modulator tube. For example, the reactive circuit may include an inductive winding serially connected with a tuning capacitor and the modulator diode, whereby the capacitor may be adjusted to provide near-resonance as described heretofore. The average diode bias voltage might be provided in any desired manner, and the diode modulation voltage might be provided by a conventional microphone-audio amplifier combination. The resultant improved circuit provides a simple frequency modulation transmitter having several advantages over a conventional "reactance tube" circuit, since greater stability and wider band frequency modulation is provided.

Thus the invention described comprises several embodiments of coaxial and cavity resonator tuned circuits wherein the Q of the circuit is varied as a function of modulating signals applied to a thermionic tube coupled to the circuit and wherein said Q variations provide frequency modulation of a microwave generator coupled to said circuit. The degree of frequency modulation is of the order of 50 times greater than that obtainable by directly varying the Q of the microwave generator in response to the modulation signals. Increased stability of operation also is provided, and amplitude modulation is minimized.

I claim as my invention:

1. The method of employing a tuned circuit including an electronic device for modulating the frequency of a radio frequency generator comprising coupling said circuit to said generator, tuning said circuit normally to a frequency of the order of that of said generator, and varying at a modulation frequency the conductance of said device to vary the Q of said circuit and the frequency of said generator.

2. The method of employing a tuned circuit including an electronic device for modulating the frequency of a radio frequency generator in response to modulation signals comprising coupling said circuit to said generator, tuning said circuit normally to a frequency different than that of said generator, and applying said signals to said device for varying at said modulation frequency the conductance of said device to vary the Q of said circuit and the frequency of said generator.

3. The method of employing a tuned circuit including an electronic device for modulating the carrier frequency of a radio frequency generator in response to modulation signals comprising inductively coupling said circuit to said generator, tuning said circuit normally to the frequency of said generator, and applying said signals to said device for varying at said modulation frequency the conductance of said device to vary the Q of said circuit and the carrier frequency of said generator.

4. A frequency modulation system including a radio frequency generator having a frequency determining tuned circuit, a second tuned circuit coupled into said first tuned circuit, said second tuned circuit including a variable conductance device, and means for varying the conductance of said device as a function of the desired modulation of said generator, said variations of the conductance of said device providing corresponding variations of the Q of said second circuit and of the output frequency of said generator.

5. A frequency modulation system including a microwave generator having a carrier frequency determining cavity resonator, a tuned circuit coupled into said resonator, said tuned circuit including a variable conductance device, a source of modulation signals and means for applying said signals to said device for varying the conductance of said device, said variations of the conductance of said device providing corresponding variations of the Q of said circuit and of the carrier microwave frequency of said generator.

6. A frequency modulation system including a microwave generator having a carrier frequency determining cavity resonator, a tuned coaxial line coupled into said resonator, a variable conductance device connected to said line, a source of modulation signals, and means for applying said signals to said device for varying the conductance of said device, said variations of the conductance of said device providing corresponding variations of the Q of said line and of the carrier microwave frequency of said generator.

7. A frequency modulation system including a microwave generator having a carrier frequency determining cavity resonator, a tuned coaxial line coupled into said resonator, a thermionic tube connected to said line, a source of modulation signals, and means for applying said signals to said tube to vary its conductance, said variations of the conductance of said tube providing corresponding variations of the Q of said line and of the carrier microwave frequency of said generator.

8. A frequency modulation system including a microwave generator having a carrier frequency determining cavity resonator, a tuned coaxial line, a coupling loop terminating one end of said line and coupled into said resonator, a thermionic tube terminating the remaining end of said line, a source of modulation signals, and means for applying said signals to said tube to vary its conductance, said variations of the conductance of said tube providing corresponding variations of the Q of said line and of the carrier microwave frequency of said generator.

9. A frequency modulation system including a microwave generator having a carrier frequency determining cavity resonator, a tuned coaxial line, a coupling loop terminating one end of said line and coupled into said resonator, a triode thermionic tube having an anode-cathode circuit terminating the remaining end of said line, a source of modulation signals, and means for applying said signals to the grid-cathode circuit of said tube to vary its anode-cathode conductance, said variations of the conductance of said tube providing corresponding variations of the Q of said line and of the carrier microwave frequency of said generator.

10. A frequency modulation system including a microwave generator having a carrier frequency determining cavity resonator, a tunable coaxial line, means for tuning said line, a coupling loop terminating one end of said line and coupled into said resonator, a thermionic tube terminating the remaining end of said line, a source of modulation signals, and means for applying said signals to said tube to vary its conductance, said variations of the conductance of said tube providing corresponding variations of the Q of said line and of the carrier microwave frequency of said generator.

11. A frequency modulation system including a microwave generator having a carrier frequency determining cavity resonator, a tuned coaxial line, a coupling loop terminating one end of said line and coupled into said resonator, series capacitive means and a thermionic tube terminating the remaining end of said line, a source of modulation signals, and means for applying said signals to said tube to vary its conductance, said variations of the conductance of said tube providing corresponding variations of the Q of said line and of the carrier microwave frequency of said generator.

12. A frequency modulation system including a microwave generator having a carrier frequency determining cavity resonator, a tuned coaxial line, a coupling loop terminating one end of said line and coupled into said resonator, a thermionic tube terminating the remaining end of said line, a source of modulation signals, means for applying said signals to said tube to vary its conductance, said variations of the conductance of said tube providing corresponding variations of the Q of said line and of the carrier microwave frequency of said generator, and a load coupled into said resonator.

13. A frequency modulation system including a microwave generator having a carrier frequency determining cavity resonator, a tuned coaxial line, a coupling loop terminating one end of said line and coupled into said resonator, a thermionic tube terminating the remaining end of said line, said tube including an evacuated envelope enclosing a thermionic cathode and a secondary-electron-emissive anode, said cathode and anode having substantially parallel disposed faces spaced such that the average electron transit time therebetween is in excess of one-tenth cycle of said carrier frequency, a source of modulation signals, and means for applying said signals to said tube to vary its conductance, said variations of the conductance of said tube providing corresponding variations of the Q of said line and of the carrier microwave frequency of said generator.

14. A frequency modulation system including a microwave generator having a carrier frequency determining cavity resonator, a tuned coaxial line, a coupling loop terminating one end of said line and coupled into said resonator, a triode thermionic tube terminating the remaining end of said line, said tube including an evacuated envelope enclosing a thermionic cathode, a control grid and a secondary-electron-emissive anode, said cathode and anode having substantially parallel disposed faces spaced such that the average electron transit time therebetween is in excess of one-tenth cycle of said carrier frequency, a source of modulation signals, and means for applying said signals to said control grid and cathode of said tube to vary its conductance, said variations of the conductance of said tube providing corresponding variations of the Q of said line and of the carrier microwave frequency of said generator.

15. An electron discharge tube including an evacuated envelope enclosing a thermionic cathode and an anode, said cathode and said anode having substantially parallel faces spaced of the order of .005 inch.

16. A modulation system according to claim 4 wherein the frequency of said generator varies at an increasing rate as a function of the magnitudes of said modulation signals, and including means for modifying said applied modulation signals at a complementary decreasing rate as a function of the magnitudes of said signals whereby said generator frequency varies substantially linearly with the magnitudes of said modulation signals.

17. A modulation system according to claim 4 wherein the frequency of said generator decreases at an increasing rate as a function of increasing magnitudes of said modulation signals, and including means for modifying said applied modulation signals at a decreasing rate as a function of increasing magnitudes of said signals whereby said generator frequency decreases substantially linearly with the magnitudes of said modulation signals.

18. A modulation system according to claim 4 wherein the frequency of said generator varies at an increasing rate in inverse relation to the voltage magnitudes of said modulation signals, and including means for modifying said applied modulation signals at a decreasing rate in inverse relation to the voltage magnitudes of said source signals, whereby said generator frequency varies substantially linearly inversely with the voltage magnitudes of said modulation source signals.

19. A modulation system according to claim 4 wherein the frequency of said generator varies at an increasing rate as an inverse function of the voltage magnitudes of said modulation signals, and means including a pentode thermionic discharge tube interposed between said modulation signal source and said variable conductance device for modifying said source modulation signals at a decreasing rate as an inverse function of the voltage magnitudes of said source signals, whereby said generator frequency varies substantially inversely linearly with the voltage magnitudes of said modulation source signals.

20. A modulation system according to claim 4 wherein the frequency of said generator varies at an increasing rate as an inverse function of the voltage magnitudes of said modulation signals, and including a pentode thermionic tube interposed between said modulation signal source and said variable conductance device for modifying said source modulation signals to provide applied modulation signals having currents varying linearly with said source signal voltages and having voltages varying at a decreasing rate as an inverse function of the voltage magnitudes of said source signals whereby said generator frequency varies substantially linearly with the magnitudes of said modulation source signals.

21. A modulation system according to claim 8 wherein the frequency of said generator varies at an increasing rate as an inverse function of the voltage magnitudes of said modulation signals, and including a pentode thermionic tube having a shunt output resistor interposed between said modulation signal source and said first-mentioned tube for modifying said source modulation signals to provide applied modulation signals having currents varying linearly with said source signal voltages and having voltages varying at a decreasing rate as an inverse function of the voltage magnitudes of said source signals whereby said generator frequency varies substantially linearly with the magnitudes of said modulation source signals.

22. A modulation system according to claim 8 wherein the frequency of said generator varies at an increasing rate as an inverse function of the voltage magnitudes of said modulation signals, and including a pentode thermionic tube having a shunt output resistor interposed between said modulation signal source and said first-mentioned tube and in opposite polarity thereto for modifying said source modulation signals to provide applied modulation signals having currents varying linearly with said source signal voltages and having voltages varying at a decreasing rate as an inverse function of the voltage magnitudes of said source signals whereby said generator frequency varies substantially linearly with the magnitudes of said modulation source signals.

23. A frequency modulation system including a microwave generator having a carrier frequency determining cavity resonator, a tuned circuit coupled into said resonator, said tuned circuit including a variable conductance device comprising a triode thermionic tube having an anode-grid circuit serially connected with said tuned circuit, a source of modulation signals, and means for applying said signals to said tube for varying the conductance of said tube anode-grid circuit, said variations of the conductance of said tube circuit providing corresponding variations of the Q of said tuned circuit and of the carrier microwave frequency of said generator.

24. A frequency modulation system including a microwave generator having a carrier frequency determining cavity resonator, a tuned coaxial line, a coupling loop terminating one end of said line and coupled into said resonator, a triode thermionic tube having an anode-grid circuit terminating the remaining end of said line, a source of modulation signals, and means for applying said signals to the grid-cathode circuit of said tube to vary its anode-grid conductance, said variations of the conductance of said tube providing corresponding variations of the Q of said line and of the carrier microwave frequency of said generator.

25. A frequency modulation system including a microwave generator having a carrier frequency determining cavity resonator, a second tunable cavity resonator, means providing microwave coupling between said resonators, a thermionic tube coupled into said second resonator for varying the tuning thereof, a source of modulation signals, means for applying said signals to said tube to vary its conductance, said variations of the conductance of said tube providing corresponding variations of the Q of said second resonator and of the carrier microwave frequency of said generator, and a load coupled into said first-mentioned resonator.

26. A system according to claim 25 wherein said second resonator includes a reentrant portion having said tube shunt-coupled to said second resonator at said reentrant portion.

27. The method according to claim 2 employing a thermionic tube coupled to said second tuned circuit, including combining the reactive and conductive characteristics of said tube to operate said tuned circuits and said generator in the second quadrant of their combined resonant characteristic.

ROBERT L. SPROULL.

REFERENCES CITED

The following references are of record in the file of this patent:

UNITED STATES PATENTS

| Number | Name | Date |
|---|---|---|
| 2,117,089 | Goodrick | May 10, 1938 |
| 2,200,986 | Fraenckel | May 14, 1940 |
| 2,213,104 | Glugas | Aug. 27, 1940 |
| 2,241,976 | Blewett et al. | May 13, 1941 |
| 2,272,165 | Varian et al. | Feb. 3, 1942 |
| 2,279,659 | Crosby | Apr. 14, 1942 |
| 2,312,919 | Litton | Mar. 2, 1943 |
| 2,314,794 | Linder | Mar. 23, 1943 |
| 2,374,810 | Fremlin | May 1, 1945 |
| 2,421,725 | Stewart | June 3, 1947 |
| 2,436,834 | Stodola | Mar. 2, 1948 |